(12) United States Patent
Keller et al.

(10) Patent No.: US 10,712,818 B2
(45) Date of Patent: *Jul. 14, 2020

(54) FIDUCIAL RINGS IN VIRTUAL REALITY

(71) Applicant: Facebook Technologies, LLC, Menlo Park, CA (US)

(72) Inventors: Sean Jason Keller, Kirkland, WA (US); David R. Perek, Bellevue, WA (US); Tristan Thomas Trutna, Seattle, WA (US); Garett Andrew Ochs, Seattle, WA (US); Nicholas Roy Corson, Mukilteo, WA (US); Raymond King, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/106,633

(22) Filed: Aug. 21, 2018

(65) Prior Publication Data

US 2018/0373332 A1 Dec. 27, 2018

Related U.S. Application Data

(63) Continuation of application No. 15/340,888, filed on Nov. 1, 2016, now Pat. No. 10,088,902.

(51) Int. Cl.
| | |
|---|---|
| *G06F 3/01* | (2006.01) |
| *G09G 5/00* | (2006.01) |
| *G02B 27/01* | (2006.01) |
| *G06F 3/147* | (2006.01) |
| *G06F 3/03* | (2006.01) |

(52) U.S. Cl.
CPC ........... *G06F 3/014* (2013.01); *G02B 27/017* (2013.01); *G02B 27/0172* (2013.01);
(Continued)

(58) Field of Classification Search
CPC .......... G06F 3/014; G06F 3/016; G06F 3/017; G06F 3/147; G06F 3/0325; G06F 3/0346;
(Continued)

(56) References Cited

U.S. PATENT DOCUMENTS

| | | |
|---|---|---|
| 6,771,294 B1 | 8/2004 | Pulli et al. |
| 8,179,604 B1 * | 5/2012 | Prada Gomez .... G02B 27/0093 345/8 |

(Continued)

*Primary Examiner* — Tom V Sheng
(74) *Attorney, Agent, or Firm* — Fenwick & West LLP

(57) ABSTRACT

A virtual reality system enables a user to interact with virtual objects. The system includes a fiducial ring, an imaging device and a console. The fiducial ring includes a ring body that includes a plurality of fiducial markers that each correspond to a different location on the ring body. An imaging device is configured to capture one or more images of the fiducial ring. The console receives the images that include an image of one or more fiducial markers. Based on the received images of the fiducial markers, the console determines a location on the fiducial ring that corresponds to the imaged fiducial marker. The console determines a position of the fiducial ring based on the determined location of the fiducial marker on the fiducial ring. The console provides content to a head mounted display (HMD) based on the determined position of the fiducial ring.

20 Claims, 4 Drawing Sheets

(52) U.S. Cl.
CPC ............ *G06F 3/016* (2013.01); *G06F 3/017* (2013.01); *G06F 3/0304* (2013.01); *G06F 3/147* (2013.01); *G09G 5/003* (2013.01); *G02B 2027/014* (2013.01); *G02B 2027/0138* (2013.01); *G02B 2027/0187* (2013.01); *G09G 2320/0693* (2013.01)

(58) Field of Classification Search
CPC ............ G06F 3/0304; G06F 17/30247; G02B 27/0172; G02B 2027/0138; G02B 2027/014; G02B 27/017; G02B 2027/0187; G09G 5/003; G09G 2320/0693; G06T 2207/30204
See application file for complete search history.

(56) References Cited

U.S. PATENT DOCUMENTS

| | | | |
|---|---|---|---|
| 9,746,921 B2 * | 8/2017 | Mallinson | G06F 3/014 |
| 10,088,902 B2 * | 10/2018 | Keller | G06F 3/147 |
| 2002/0065461 A1 * | 5/2002 | Cosman | A61B 6/5247 |
| | | | 600/426 |
| 2006/0134583 A1 * | 6/2006 | Gonzalez de Mendoza y Kaeding | A63B 24/00 |
| | | | 434/55 |
| 2008/0231926 A1 * | 9/2008 | Klug | H04N 13/327 |
| | | | 359/23 |
| 2012/0268359 A1 | 10/2012 | Chen et al. | |
| 2013/0169560 A1 | 7/2013 | Cederlund et al. | |
| 2013/0278631 A1 * | 10/2013 | Border | G02B 27/017 |
| | | | 345/633 |
| 2014/0125577 A1 | 5/2014 | Hoang et al. | |
| 2015/0062086 A1 * | 3/2015 | Nattukallingal | G06F 3/016 |
| | | | 345/175 |
| 2015/0258431 A1 * | 9/2015 | Stafford | A63F 13/213 |
| | | | 463/31 |
| 2015/0258432 A1 * | 9/2015 | Stafford | A63F 13/213 |
| | | | 463/32 |
| 2015/0363034 A1 | 12/2015 | Hinckley et al. | |
| 2016/0332071 A1 * | 11/2016 | Hirata | A63F 13/213 |
| 2017/0086712 A1 * | 3/2017 | Mauro | G06K 9/00355 |
| 2017/0123494 A1 * | 5/2017 | Tyagi | G06K 9/00355 |

* cited by examiner

FIDUCIAL RINGS IN VIRTUAL REALITY

CROSS REFERENCE TO RELATED APPLICATIONS

This application is a continuation of pending U.S. application Ser. No. 15/340,888, filed Nov. 1, 2016, which is incorporated by reference in its entirety.

BACKGROUND

The present disclosure generally relates to a system for haptic feedback to a user, and specifically to haptic devices that include fiducial markers to track the movement of a user's fingers in the virtual reality (VR) system.

Virtual reality (VR) is a simulated environment created by computer technology and presented to a user, such as through a VR system. Typically, a VR system includes a head-mounted display (HMD) that provides visual and audio information to the user. Conventional VR systems create virtual body parts (e.g., a virtual finger) in the simulated environment and use a tracking system to track a user movement in a physical space. The simulated environment presented to the user may be updated according to the user movement in the physical space.

SUMMARY

A locator assembly within a virtual reality environment enables a user to interact with virtual objects via individual fingers. The locator assembly includes one or more fiducial rings that can be worn on portion of the user's body. In some embodiments, a fiducial ring may be worn one, e.g., a finger, an arm, a leg, etc. Each fiducial ring includes a ring body that includes one or more fiducial markers. Each fiducial marker is positioned at a different location on the ring body. The fiducial markers may be configured as a unique combination on every fiducial ring.

An imaging device is configured to capture one or more images of each of the fiducial rings within the locator assembly. The imaging device may be an optical imaging device (e.g., visible light, infrared light, etc.), some other type of imaging device (e.g., radio frequency imaging, acoustic imaging (e.g., ultrasound), etc.), or some combination thereof. In one embodiment, the fiducial ring may include a sensor to sense a motion of the user's finger. Based on the sensed motion, the locator assembly may send a corresponding output to the console. The console may configure the imaging device to capture one or more images of the motion-sensed fiducial ring.

A console receives the images that include the fiducial markers on each fiducial ring. Based on the received images of the fiducial markers, the console determines a location of the fiducial ring that corresponds to the imaged fiducial marker. The console determines a position of the fiducial ring within the virtual reality environment, based on the determined location of the fiducial marker on the fiducial ring. Based on the determined position of the fiducial rings, the console provides content to a head-mounted display.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Configuration Overview

A haptic system includes one or more fiducial rings that each includes one or more fiducial markers to determine a position of a user's finger. A fiducial ring includes a set of fiducial markers that each correspond to a different location on the ring body. The fiducial ring is configured to fit on a portion of a user's finger, such as bottom of the finger, top of the finger or the bend of the finger. Alternatively, the ring can be configured to fit on any portion of a thumb of a user.

In one embodiment, a VR console may receive an image of the fiducial markers on each of the plurality of fiducial rings. Based on the received images, the VR console can determine a location on the fiducial ring that corresponds to an imaged fiducial marker. Based on the determined location of the fiducial marker, the VR console may determine a position of the fiducial ring and thus, the position of the user's finger in the virtual space.

In one embodiment, based on the determined position of the fiducial ring, a fast calibration information signal indicating a virtual touch event may be sent to the VR system. Responsive to the virtual touch event, the VR system provides haptic feedback to the user that includes perception of touch of a virtual object in the VR system.

System Overview

Figure 1:
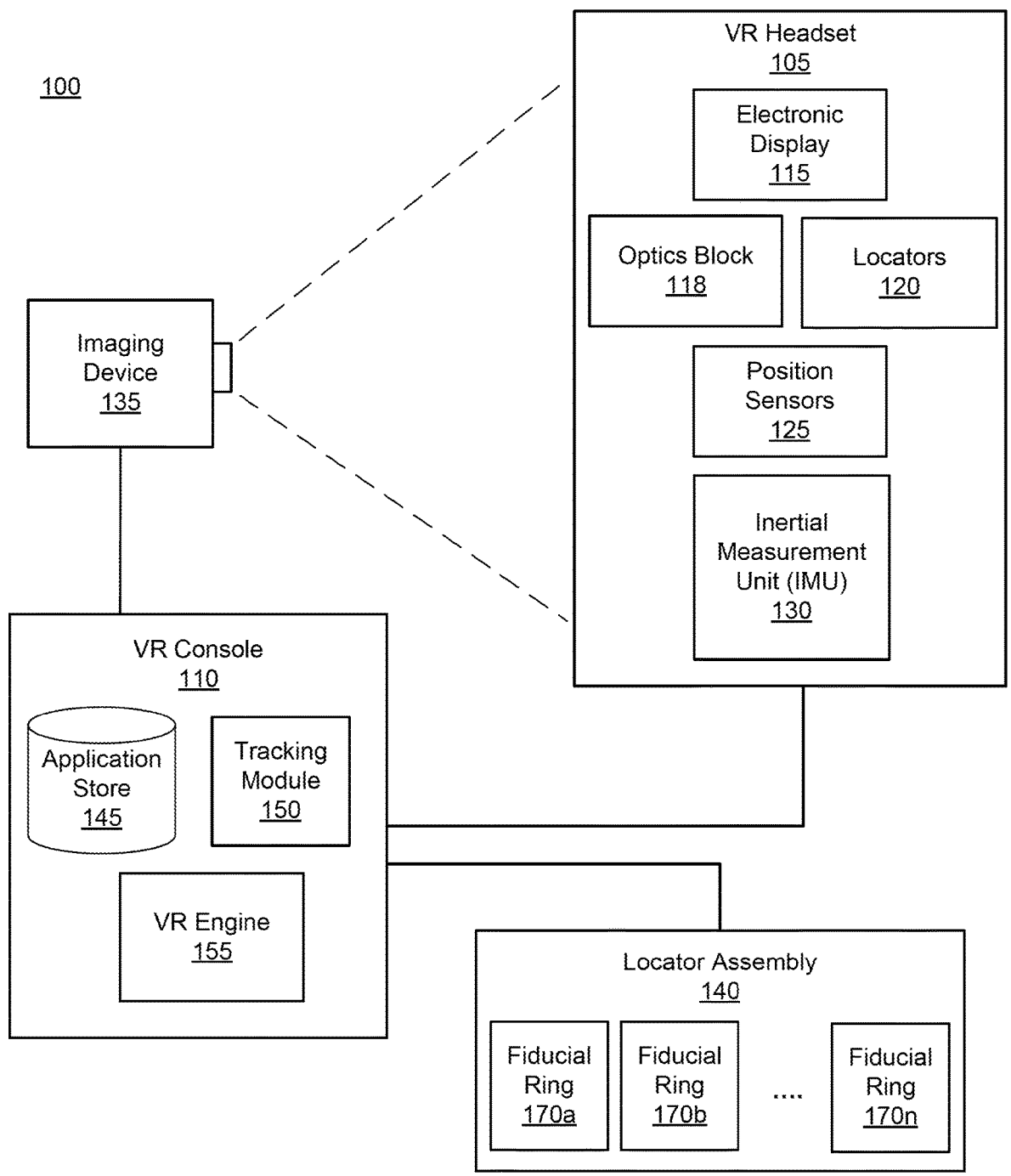
FIG. 1 is a block diagram of a system environment including a VR system, in accordance with an embodiment.

FIG. 1 is a block diagram of a VR system environment 100 in which a VR console 110 operates. The system environment 100 shown by FIG. 1 comprises a HMD 105, an imaging device 135, and a locator assembly 140. While FIG. 1 shows an example system 100 including one HMD 105, one imaging device 135, and one locator assembly 140 (e.g., a fiducial ring), in other embodiments any number of these components may be included in the system 100. For example, there may be multiple VR headsets 105 each having an associated locator assembly 140 and being monitored by one or more imaging devices 135, with each VR headset 105, locator assembly 140, and imaging devices 135 communicating with the VR console 110. In alternative configurations, different and/or additional components may be included in the system environment 100. Similarly, the functions can be distributed among the components in a different manner than is described here. For example, some or all of the functionality of the VR console 110 may be contained within the HMD 105.

The HMD 105 is a head-mounted display that presents media to a user. Examples of media presented by the HMD 105 include one or more images, video, audio, or any combination thereof. In some embodiments, audio is presented via an external device (e.g., speakers and/or headphones) that receives audio information from the HMD 105, the VR console 110, or both, and presents audio data based on the audio information. In some embodiments, the HMD 105 may also act as an augmented reality (AR) HMD and/or mixed reality (MR) HMD. In these embodiments, the HMD 105 augments views of a physical, real-world environment with computer-generated elements (e.g., images, video, sound, etc.).

The HMD 105 includes an electronic display 115, an optics block 118, one or more locators 120, one or more position sensors 125, and an inertial measurement unit (IMU) 130. The electronic display 115 displays images to the user in accordance with data received from the VR console 110.

The optics block 118 magnifies received light from the electronic display 115, corrects optical errors associated with the image light, and the corrected image light is presented to a user of the HMD 105. An optical element may be an aperture, a Fresnel lens, a convex lens, a concave lens, a filter, or any other suitable optical element that affects the image light emitted from the electronic display 115. Moreover, the optics block 118 may include combinations of different optical elements. In some embodiments, one or more of the optical elements in the optics block 118 may have one or more coatings, such as anti-reflective coatings.

The locators 120 are objects located in specific positions on the HMD 105 relative to one another and relative to a specific reference point of the HMD 105 on the HMD 105. A locator 120 may be a light emitting diode (LED), a corner cube reflector, a reflective marker, a type of light source that contrasts with an environment in which the HMD 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 120 are located beneath an outer surface of the HMD 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the HMD 105 are opaque in the visible band of wavelengths of light. Thus, the locators 120 may emit light in the IR band under an outer surface that is transparent in the IR band but opaque in the visible band.

The IMU 130 is an electronic device that generates fast calibration data (herein also referred to as "fast calibration information") of the HMD 105 based on measurement signals received from one or more of the position sensors 125. A position sensor 125 generates one or more measurement signals in response to motion of the HMD 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data of the HMD 105 indicating an estimated position of the HMD 105 relative to an initial position of the HMD 105. For example, the position sensors 125 include multiple accelerometers to measure translational motion (forward/back, up/down, left/right) and multiple gyroscopes to measure rotational motion (e.g., pitch, yaw, roll) of the HMD 105. In some embodiments, the IMU 130 rapidly samples the measurement signals and calculates the estimated position of the HMD 105 from the sampled data. For example, the IMU 130 integrates the measurement signals received from the accelerometers over time to estimate a velocity vector and integrates the velocity vector over time to determine an estimated position of a reference point of the HMD 105 on the HMD 105. Alternatively, the IMU 130 provides the sampled measurement signals to the VR console 110, which determines the fast calibration data of the HMD 105. The reference point of the HMD 105 is a point that may be used to describe the position of the HMD 105. While the reference point of the HMD 105 may generally be defined as a point in space; however, in practice the reference point of the HMD 105 is defined as a point within the HMD 105 (e.g., a center of the IMU 130).

The IMU 130 receives one or more calibration parameters of the HMD 105 from the VR console 110. As further discussed below, the one or more calibration parameters of the HMD 105 are used to maintain tracking of the HMD 105. Based on a received calibration parameter of the HMD 105, the IMU 130 may adjust one or more IMU parameters (e.g., sample rate). In some embodiments, certain calibration parameters of the HMD 105 cause the IMU 130 to update an initial position of the reference point of the HMD 105 so it corresponds to a next calibrated position of the reference point of the HMD 105. Updating the initial position of the reference point of the HMD 105 as the next calibrated position of the reference point of the HMD 105 helps reduce accumulated error associated with the determined estimated position. The accumulated error, also referred to as drift error, causes the estimated position of the reference point of the HMD 105 to "drift" away from the actual position of the reference point of the HMD 105 over time.

The locator assembly 140 is an apparatus for tracking a position and/or movement of a portion of user's body (e.g., arm, leg, finger, etc. In some embodiments, the locator assembly 140 may, e.g., be used to track a position and/or movement of a user's finger. The locator assembly 140 includes one or more fiducial rings 170a ... 170n (generally termed as fiducial ring 170). A fiducial ring 170 includes a ring body that includes one or more fiducial markers. In some embodiments, the fiducial rings 170 are employed to determine a physical position or movement of the locator assembly 140. In another embodiment, the locator assembly 140 may receive, from the VR console 110, a haptic feedback signal corresponding to haptic feedback to provide to the user. The fiducial ring 170 is configured to couple to a portion of a user's body. For example, a fiducial ring 170 may fit around an arm of a user, a finger of a user, etc.

The fiducial ring 170 includes fiducial markers located in specific positions on the locator assembly 140 relative to one another and relative to a specific reference point of the locator assembly 140 on the locator assembly 140. A fiducial marker is substantially similar to a locator 120 except that a fiducial marker is part of the locator assembly 140. In some embodiments, the fiducial marker may emit light similar to the locator 120, however, in alternate embodiments, the fiducial marker may also or alternatively emit other signals. For example, the fiducial marker may emit acoustic signals, radio frequency signals, etc. Fiducial markers also may be passive as discussed below with regard to FIG. 2. Additionally, in some embodiments, the outer surface or other portions of the locator assembly 140 are opaque in the visible band of wavelengths of light. Thus, the fiducial marker may emit light in the IR band under an outer surface that is transparent in the IR band but opaque in the visible band.

In one embodiment, the haptic feedback signal indicates a position or a portion of the locator assembly 140 to be actuated, and an amount of actuation of the position or the portion of the locator assembly 140 for providing haptic feedback. In this embodiment, the amount of actuation is determined by, e.g., the VR console 110, according to a virtual position of the locator assembly 140 corresponding to a physical position of the locator assembly 140 and a virtual position of a virtual object in a virtual space. In some embodiments, the VR console 110 may receive sensor information that includes a force value indicating an amount of pressure on the locator assembly 140. In addition to the position of the locator assembly 140, the VR console 110 may use the applied pressure/force information from the locator assembly 140 to determine the amount of actuation. The locator assembly 140 provides tactile perception of a user touching the virtual object, by actuating a haptic apparatus, according to the amount of actuation indicated by the haptic feedback signal.

The locator assembly 140 may optionally include a haptic apparatus that provides to the user the haptic feedback of touching a virtual object in a virtual space, according to the haptic feedback signal. For example, the locator assembly 140 determines a location and/or movement of a user's finger, corresponding to a virtual touch event in the virtual space. The haptic apparatus may restrict the movement of a user's finger as a perception of virtual touch in the virtual space. For example, if a user finger is in contact with a virtual object (e.g., a virtual wall) in a virtual space, the locator assembly 140 receives a haptic feedback signal that prevents a physical movement of the user finger to move in a direction through the virtual object in the virtual space. Accordingly, the user can receive a perception of contacting the virtual object.

In one embodiment, the locator assembly 140 includes a fiducial ring 170. The fiducial ring 170 may be connected to a pressure sensor. The pressure sensor generates a signal as a function of the imposed pressure. For example, a movement of a user's finger or a bending of a user's finger may impose pressure on the pressure sensor connected to the fiducial ring 170 worn by the user. The pressure sensor may detect this imposed pressure and generate an electrical signal that indicates the amount of imposed pressure, generated as a result of the change in movement of the user's finger. Different embodiments of the locator assembly 140 and its operation are described in detail below with respect to FIGS. 2-4. In one embodiment, the locator assembly 140 is a fiducial ring through which the VR console 110 can detect and/or track a user finger/hand movement as described in detail with respect to FIGS. 2 through 4.

The imaging device 135 generates slow calibration data in accordance with calibration parameters received from the VR console 110. Slow calibration data (herein also referred to as "slow calibration information") of the HMD 105 includes one or more images showing observed positions of the locators 120 associated with the HMD 105 that are detectable by the imaging device 135. Similarly, slow calibration data of the locator assembly 140 includes one or more images showing observed positions of the fiducial rings 170 associated with the locator assembly 140 that are detectable by the imaging device 135. In one aspect, the slow calibration data includes one or more images of both the HMD 105 and locator assembly 140. The imaging device 135 may include one or more cameras, one or more video cameras, and any other device capable of capturing images including one or more of the locators 120 and 170, a radio frequency imaging device, an acoustic imaging (e.g., ultrasound, etc.), or some combination thereof. IN embodiments, where the imaging device 135 captures optical images, the imaging device 135 may capture images in the visible band, the infrared band, the ultraviolet band, some other portion of the electromagnetic spectrum, or some combination thereof. Additionally, the imaging device 135 may include one or more filters (e.g., used to increase signal to noise ratio). The imaging device 135 is configured to detect light emitted or reflected from locators 120 and 170 in a field of view of the imaging device 135. In embodiments where the locators 120 and 170 include passive elements (e.g., a retroreflector), the imaging device 135 may include a source that illuminates some or all of the locators 120 and 170 with an illumination signal (e.g., light, radio frequency signal, ultrasound, etc.), which reflect the illumination signal towards the source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR console 110 provides media to the HMD 105 for presentation to the user in accordance with information received from one or more of: the imaging device 135, the HMD 105, and the locator assembly 140. The VR console 110 may also instruct the locator assembly 140 to provide haptic feedback including a perception of a user contacting a virtual object. In the example shown in FIG. 1, the VR console 110 includes an application store 145, a tracking module 150, and a VR engine 155. Some embodiments of the VR console 110 have different modules than those described in conjunction with FIG. 1. Similarly, the functions further described below may be distributed among components of the VR console 110 in a different manner than is described here.

The application store 145 stores one or more applications for execution by the VR console 110. An application is a group of instructions, that when executed by a processor, generates content for presentation to the user. Content generated by an application may be in response to inputs received from the user via movement of the HMD 105 or the VR locator assembly 140. Examples of applications include: gaming applications, conferencing applications, video playback application, or other suitable applications.

The tracking module 150 calibrates the VR system 100 using one or more calibration parameters and may adjust one or more calibration parameters to reduce error in determination of the position of the HMD 105 and/or the locator assembly 140.

The tracking module 150 tracks movements of the HMD 105 and/or the locator assembly 140 using slow calibration information of the HMD 105 or the fiducial rings 170 of the locator assembly 140 from the imaging device 135. The tracking module 150 determines positions of a reference point of the HMD 105 or the locator assembly 140 using observed locators from the slow calibration information and a model of the HMD 105. The tracking module 150 also determines positions of a reference point of the HMD 105 using position information from the fast calibration information of the HMD 105 or the locator assembly 140. Additionally, in some embodiments, the tracking module 150 may use portions of the fast calibration information, the slow calibration information, or some combination thereof of the HMD 105 or the locator assembly 140, to predict a future location of the headset 105 or the locator assembly 140. The tracking module 150 provides the estimated or predicted future position of the HMD 105 or the locator assembly 140 to the VR engine 155.

The VR engine 155 executes applications within the system environment 100 and receives position information, acceleration information, velocity information, predicted future positions, or some combination thereof of the HMD 105 from the tracking module 150. Based on the received information, the VR engine 155 determines content to provide to the HMD 105 for presentation to the user. For example, if the received information indicates that the user has looked to the left, the VR engine 155 generates content for the HMD 105 that mirrors the user's movement in a virtual environment. Additionally, the VR engine 155 performs an action within an application executing on the VR console 110 in response to detecting a motion of the locator assembly 140 and provides feedback to the user that the action was performed. In one example, the VR engine 155 instructs the HMD 105 to provide visual or audible feedback to the user. In another example, the VR engine 155 instructs the locator assembly 140 to provide haptic feedback including a perception of a user touching a virtual object.

In addition, the VR engine 155 receives position information, acceleration information, velocity information, predicted future positions or some combination thereof of the locator assembly 140 from the tracking module 150 and determines whether a virtual touch event occurred. A virtual touch event herein refers to an event of a user contacting a virtual object in a virtual space. For example, an image of a virtual object is presented to the user on the HMD 105. Meanwhile, the VR engine 155 collectively analyzes positions of multiple sensors of the locator assembly 140 through the tracking module 150, and generates a three dimensional mapping of the locator assembly 140 describing the position and the shape of the user's hand or fingers. The three dimensional mapping of the locator assembly 140 describes coordinates of various parts of the locator assembly 140 in a virtual space corresponding to physical positions of the user's hands along or fingers in reality. Responsive to the user performing an action to grab the virtual object or the user being contacted by the virtual object, the VR engine 155 determines that the virtual touch event occurred.

In one embodiment, the VR engine 155 compares coordinates of a virtual object and a coordinate of the locator assembly 140 in a virtual space to determine whether a virtual touch event occurred. The VR engine 155 obtains a coordinate of the virtual object in a virtual space, in accordance with an image presented via the HMD 105. Additionally, the VR engine 155 obtains a coordinate of the locator assembly 140 (e.g., one or more fiducial rings) corresponding to a physical position of the user's fingers or hand or the three dimensional mapping of the user's fingers or hand, from the tracking module 150. Then, the VR engine 155 compares the coordinate of the virtual object in the virtual space and the coordinate of the user's fingers or hand in the virtual space. For example, if two coordinates of the virtual object and the user's fingers or hand overlap or are approximate to each other within a predetermined distance for a predetermined amount of time (e.g., 1 second), the VR console 110 determines the virtual touch event occurred.

In one embodiment, the VR engine 155 performs rendering to adjust the position of a virtual object in response to the determined position or movement of the locator assembly 140. Additionally, the VR engine 155 may generate a haptic feedback signal to simulate a user touching a virtual object (i.e., provide a perception to a user that the user is touching an object). Responsive to detecting the virtual touch event, the VR engine 155 determines permissible movements and impermissible movements of the user. For example, if a user's finger is in touch with a virtual object, the VR engine 155 determines that the user cannot bend the finger in a physical direction corresponding to a virtual direction through the virtual object, because the virtual mirror of the finger in the virtual space (i.e., mapping of the finger in the virtual space) is in contact with the virtual object in the virtual direction. For an additional example, the VR engine 155 determines that the user can lift the finger in another physical direction corresponding to another virtual direction away from the virtual object, because the virtual mirror of the finger is not in contact with any object in the virtual space in said another virtual direction. According to a list of permissible movements and impermissible movements, the VR engine 155 determines a portion (e.g., a coordinate or a position) of the locator assembly 140 to be actuated (e.g., activate a vibration force) and amount of actuation (e.g., a degree of vibration). The VR engine 155 provides the haptic feedback signal indicating the portion of the locator assembly 140 and the amount of actuation to the locator assembly 140 for executing the haptic feedback.

Example Locator Assembly

Figure 2:
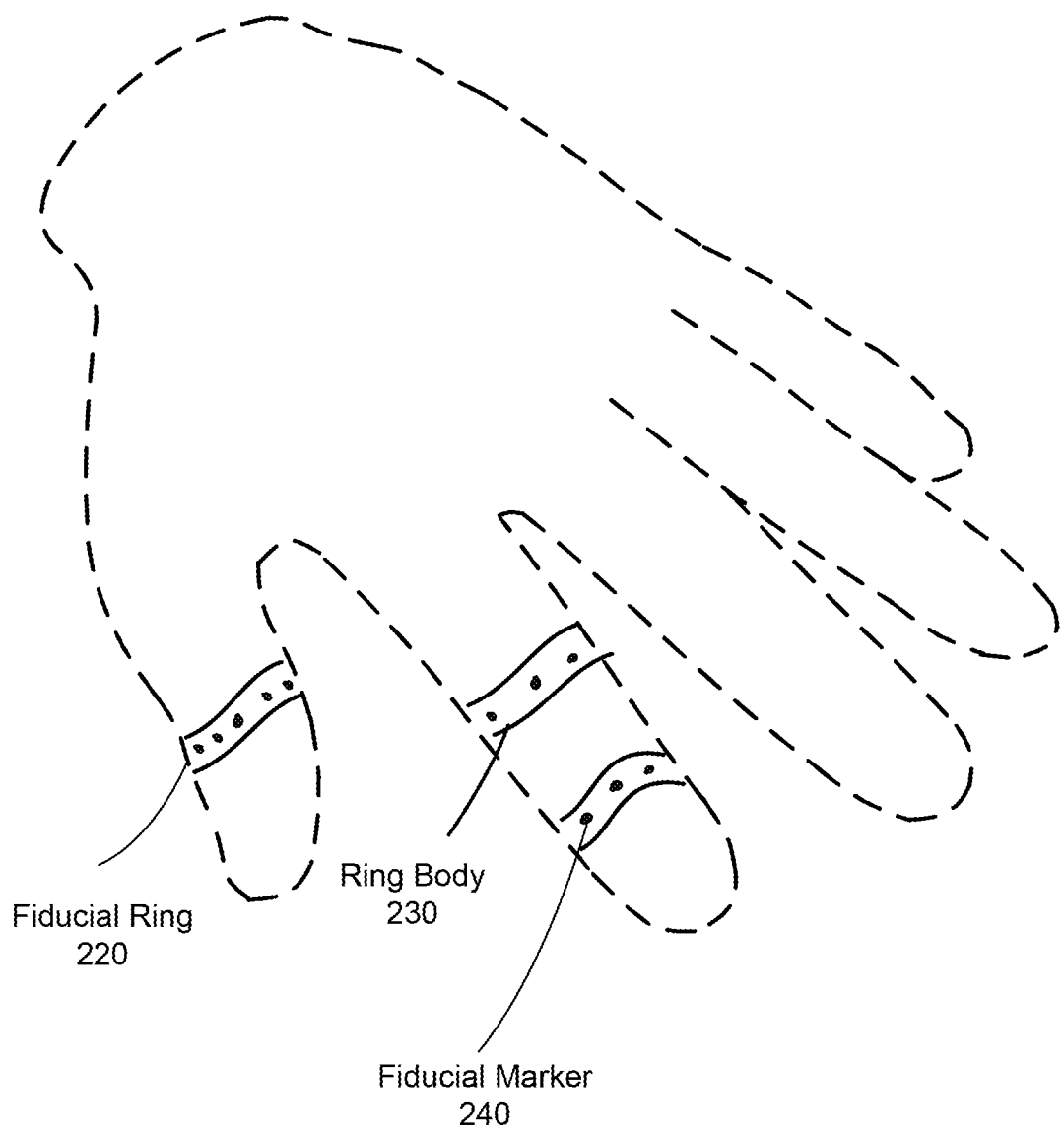
FIG. 2 is a perspective view of a fiducial ring worn on a finger or a thumb, in accordance with an embodiment.

FIG. 2 is a locator assembly 200, in accordance with an embodiment. In some embodiments, the locator assembly 200 may be, e.g., the locator assembly 140 of FIG. 1. The locator assembly 200 includes one or more fiducial rings 220. In some embodiments, a fiducial ring 220 may be configured to fit on any portion of a phalange of a user. In one embodiment, a fiducial ring is worn on each finger of the hand, including the thumb. In another embodiment, multiple fiducial rings are worn on a single finger on different portions of the user's finger, for example, one at the bottom of the finger, one at the bend of the finger and one on the top portion of the finger.

The locator assembly 200 illustrated in FIG. 2 is merely an example, and in different embodiments, a fiducial ring 220 includes fewer, more or different components than shown in FIG. 2. Moreover, in alternate embodiments, the fiducial ring 220 may be formed to fit other parts of a user's body (e.g., arm, leg, etc.).

Each fiducial ring 220 includes a ring body 230 and one or more fiducial markers 240. The ring body 230 may be of an adjustable circular structure. The adjustable feature allows the ring body 230 across a range of finger sizes and may be adjusted to fit along a different portion of a finger such as a joint, a bottom portion of a figure or a top portion of a figure. The ring body 230 may be made of, e.g., elastomers (highly stretchable), springs in general, shape memory alloy springs (stretch and then return to their original shape when heated to body temperature).

A fiducial marker 240 is an object used as a point of reference or measure. Each fiducial marker 240 is a stationary (i.e., is located at a fixed position on the ring body 220) locatable point on the ring body 220 and corresponds to a specific location on the ring body 220, relative to a location of a second fiducial marker on the ring body 220. The fiducial markers 240 are configured as a unique combination on the fiducial ring 220 for ease of recognizing a fiducial ring 220 via the imaging system. The configuration and operation of the fiducial markers 240 are similar to the fiducial marker described as a part of the locator assembly 140 of FIG. 1. Therefore, the detailed description thereof is omitted herein for the sake of brevity.

A fiducial marker 240 may be an active device such as a light emitting diode (LED), a device emitting light in the visible band, an infrared band, an ultraviolet band or any other such active device, a device that emits acoustic signals, a device that emits radio frequency signals, or some combination thereof. Alternatively, a fiducial marker 240 may be a passive device such as a corner cube reflector, a reflective marker, a retro-reflective device, a passive reflector for acoustic signals (e.g., ultrasound), a passive reflector for radio frequency signals, or any other such passive device.

The user's finger position can be determined according to the slow calibration of the fiducial markers 240 from the imaging device 135. In response to determination of movement of the user's finger, and the position of the user's finger, the locator assembly 200 receives haptic feedback including a perception of a user touching a virtual object. The haptic feedback can be provided to the user by the ring body 230 of the fiducial ring 220, or a visual feedback can be provided by changing a light pattern on the fiducial markers 225.

In one embodiment, the fiducial ring 220 is actuated to receive the haptic feedback in the visual or sensory form. For example, a visual haptic feedback may include displaying a specific light pattern on the fiducial markers 240. A sensory haptic feedback may include vibrating the ring body or inflating/deflating a portion of the ring body 220. The amount of inflation/deflation of the ring body may be adjusted as indicated by the received haptic feedback signal.

Figure 3:
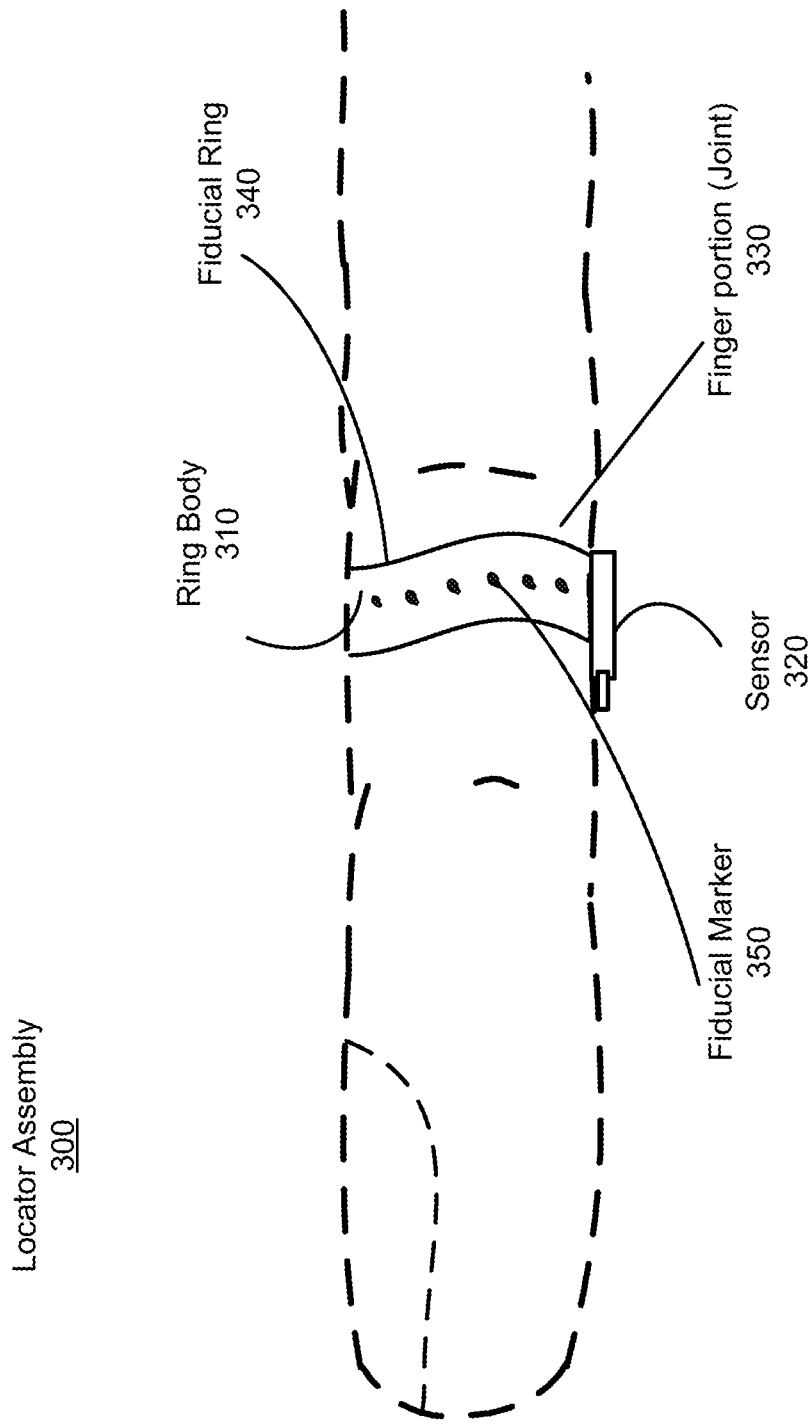
FIG. 3 is a perspective view of one of the fiducial rings of FIG. 2 showing a sensor attached to the fiducial ring, in accordance with an embodiment.

FIG. 3 is a fiducial ring 300, in accordance with an embodiment. The fiducial ring 300 is substantially the same as the fiducial ring 220, except that it further includes a sensor 320.

The sensor 320 detects events or changes in its surrounding environment such as a change in pressure, or a change in thermal energy and other such changes, and provides a corresponding output. In one embodiment, a sensor 320 is coupled to a portion of the ring body 310 (e.g., a portion corresponding to a fingertip, or a joint of the finger). The fiducial ring 340 is coupled to a corresponding finger portion 330 (e.g., a portion corresponding to a joint of the finger). In one embodiment, one or more of these components are placed beneath an outer surface of the ring body 310, thus are not visible from the outside. Additionally or alternatively, some of these components are placed on an outer surface of the ring body 310, and are visually detectable.

The sensor 320 senses a motion event on the ring body 310 or the portion of the user's finger and generates one or more measurement signals in response to motion of the fiducial ring 340. In one embodiment, the configuration and operation of the sensor 320 is similar to the position sensors 125 of the HMD 105 of FIG. 1. Therefore, the detailed description thereof is omitted herein for the sake of brevity.

In another embodiment, the sensor 320 is a pressure sensor. A pressure sensor generates one or more measurement signals in response to a change in pressure on the fiducial ring 340, generated based on the expansion or compression of skin surrounding the fiducial ring 340. The expansion or compression of skin may indicate fine motor movements of the user's finger, such as a bend in the finger.

A measurement signal may be generated in response to a change in pressure due to a bend in the finger coupled to the fiducial ring 340. Examples of pressure sensors include: capacitive pressure sensors, electronic pressure sensors, strain gauges, electromagnetic pressure sensors, thermal sensor, an optical sensor, oscillator-based frequency sensors, resistive pressure sensors, or some combination thereof. The pressure sensor may be located external to the ring body 310, or internal to the ring body 310, or coupled externally to the ring body 310 using a coupling mechanism, or some combination thereof.

Based on the one or more measurement signals from one or more pressure sensors, the locator assembly 300 generates applied pressure/force information indicating an estimated pressure/force value on the fiducial ring 340. For example, the pressure sensor may include an optical sensor such as optical fiber and measure a physical change of an optical fiber to detect the amount of force caused due to applied pressure on the fiducial ring 340. In some embodiments, locator assembly 300 generates an applied pressure/force information signal including the estimated pressure/force value. Alternatively, the applied pressure/force information signal may include measurement signals indicating a change in pressure on the fiducial ring 340. The locator assembly 300 sends the applied pressure/force information signal to the VR console 110.

Figure 4:
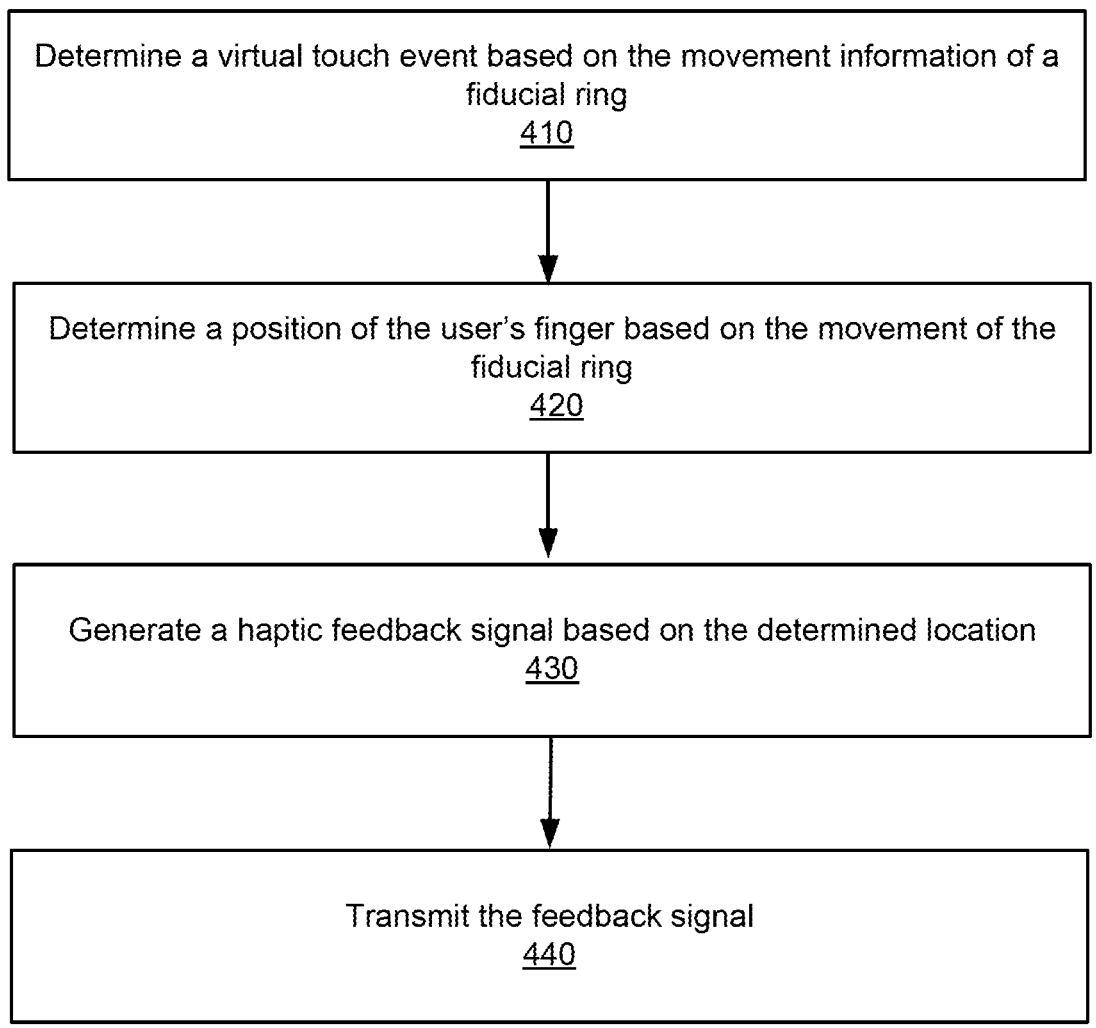
FIG. 4 is a flow chart illustrating a process of providing haptic feedback responsive to a virtual touch event in a virtual space, in accordance with an embodiment.

FIG. 4 is a flow chart illustrating a process of providing haptic feedback responsive to a virtual touch event in a virtual space, in accordance with an embodiment. In one embodiment, the process of FIG. 4 is performed by a console (e.g., VR console 110 of FIG. 1). Other entities may perform some or all of the steps of the process in other embodiments. Likewise, embodiments may include different and/or additional steps, or perform the steps in different orders.

The console determines 410 a virtual touch event occurred based on a user movement on the haptic device such as a fiducial ring 170. In one embodiment, the console receives fast calibration data from the fiducial ring and/or slow calibration data from the imaging device, and then determines a finger/hand movement. In another embodiment, the console receives applied pressure/force information from the locator assembly 140 to determine a finger bend or a stretch.

In one approach, the console obtains 3-D map of the user's fingers describing coordinates of various parts of the fiducial ring in a virtual space corresponding to physical positions of the parts of the fiducial ring in reality based on the fast calibration data and/or the slow calibration data. The console compares the coordinate of the virtual object in the virtual space and the coordinate of the fiducial ring in the virtual space to determine whether a virtual touch event occurred.

In another approach, the console obtains pressure/force information including force values on the fiducial ring on various parts of the user's fingers in a virtual space, the user's fingers may be in contact with a virtual object. Based on the amount of force, and the position of the various parts of the user's fingers in the virtual space, the console determines a fine motor movement of the finger, such as a bend in the finger that is in contact with the virtual object, thus determining a virtual touch event occurred.

Responsive to determining the virtual touch event occurred, the console receives an image of the fiducial markers on the fiducial ring. Based on the received image and the position of the fiducial markers, the console determines a location of the fiducial ring in the virtual space.

Based on the determined location, the console determines 420 a position of the user's fingers in the virtual space. For example, responsive to determining that the user's finger moved in the virtual space towards a virtual wall, the console determines the location of the virtual wall and moves the user's finger to a position closer to the virtual wall. For example, responsive to the user pressing a virtual object (e.g., a ball) in a virtual space with a bottom surface of an index finger, the console determines such virtual touch event occurred, and identifies the bottom surface of the index finger is in contact with the virtual object. The console further determines the value of the force of the user's index finger when in contact with the virtual object.

The console generates 430 a haptic feedback signal describing details of the haptic feedback to be provided to the user, according to the determined position of each fiducial ring. In some embodiments, the amount of force on the virtual object is taken into consideration by the console to determine an amount of actuation to include within the haptic feedback signal. In one embodiment, the haptic feedback signal indicates which fiducial ring should be actuated (e.g., a coordinate), and an amount of actuation (e.g., amount of vibration).

The console transmits the haptic feedback signal 440 to the appropriate fiducial ring 170 within the locator assembly 140 for providing the haptic feedback. The fiducial ring receives the haptic feedback signal, and then provides haptic feedback to the user according to the haptic feedback signal.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A system comprising:
a fiducial device including a body that includes a plurality of fiducial markers that each are positioned at different locations on the body and that each emit light, the body configured to fit on a portion of a user's body;
an imaging device separate from the fiducial device and the user's body, the imaging device configured to capture one or more images of the fiducial device by capturing the light emitted from at least one of the fiducial markers; and
a console configured to:
determine that a virtual touch event occurred based on a movement of the portion of the user's body,
responsive to the determination, receive the one or more images including at least one image of at least one of the fiducial markers,
determine a position of the fiducial device in a virtual space based part on the at least one image of the at least one fiducial marker,
determine a position of the portion of the user's body in the virtual space, based on the determined position of the fiducial device, and
generate a haptic feedback signal comprising a haptic feedback for a user, based on the determined position of the portion of the user's body in the virtual space.

2. The system of claim 1, wherein the console is further configured to:
provide content to a head-mounted display (HMD) based on the determined position of the fiducial device.

3. The system of claim 1, wherein the fiducial device further comprises a sensor coupled to the body, the sensor configured to determine the movement of the portion of the user's body by sensing a motion on the fiducial device coupled to the portion of the user's body.

4. The system of claim 1, wherein the fiducial device further comprises a sensor configured to:
determine a force applied on the body; and
in response to the determination,
generate an information signal including a value of the force, and
transmit the information signal to the system.

5. The system of claim 4, wherein the sensor detects a change in pressure on the sensor to determine the force applied on the body.

6. The system of claim 1, wherein the fiducial marker is a stationary locatable active device.

7. The system of claim 1, wherein the console is further configured to:
transmit the haptic feedback signal to the fiducial device for providing the haptic feedback to the user.

8. The system of claim 1, wherein the console is further configured to:
receive at least one of first calibration data from the fiducial device and second calibration data from the imaging device; and
determine the movement of the portion of the user's body, based on the at least one of the first calibration data and the second calibration data.

9. The system of claim 1, wherein the console is further configured to:
receive information about a force applied on the body; and
determine that the virtual touch event occurred, based on the received information.

10. The system of claim 1, wherein the fiducial device is configured to receive the haptic feedback signal including an actuation signal and an amount of actuation, and the system further comprising:
an actuation device coupled to the fiducial device, the actuation device configured to actuate the fiducial device to provide the haptic feedback to the user according to the amount of actuation.

11. A method comprising:
instructing at least one of a plurality of fiducial markers to emit light, each fiducial marker positioned at a different location on a body of a fiducial device, the body configured to fit on a portion of a user's body;
capturing, by an imaging device separate from the fiducial device and the user's body, one or more images of the fiducial device by capturing the light emitted from the at least one fiducial marker, the one or more images including an image with a fiducial marker of the plurality of fiducial markers;
determining that a virtual touch event occurred based on a movement of the portion of the user's body;
responsive to the determination, receiving the one or more images including at least one image of at least one of the fiducial markers;
determining a position of the fiducial device in a virtual space based in part on the at least one image of the at least one fiducial marker;

determining a position of the portion of the user's body in the virtual space, based on the determined position of the fiducial device; and generating a haptic feedback signal comprising a haptic feedback for a user, based on the determined position of the portion of the user's body in the virtual space.

12. The method of claim 11, further comprising:

providing content to a head-mounted display (HMD) based on the determined position of the fiducial device.

13. The method of claim 11, further comprising:

determining, by a sensor of the fiducial device coupled to the body, the movement of the portion of the user's body by sensing a motion on the fiducial device coupled to the portion of the user's body.

14. The method of claim 11, further comprising:

determining, by a sensor of the fiducial device, a force applied on the body;

in response to the determination, generating an information signal including a value of the force, and transmitting the information signal to the system.

15. The method of claim 11, further comprising:

determining a change in pressure on the sensor to determine the force applied on the body.

16. The method of claim 11, further comprising:

transmitting the haptic feedback signal to the fiducial device for providing the haptic feedback to the user.

17. The method of claim 11, further comprising:

receiving at least one of first calibration data from the fiducial device and second calibration data from the imaging device; and determining the movement of the portion of the user's body, based on the at least one of the first calibration data and the second calibration data.

18. The method of claim 11, further comprising:

receiving information about a force applied on the body; and determining that the virtual touch event occurred, based on the received information.

19. The method of claim 11, further comprising:

receiving, at the fiducial device, the haptic feedback signal including an actuation signal and an amount of actuation; and actuating, by an actuation device coupled to the fiducial device, the fiducial device to provide the haptic feedback to the user according to the amount of actuation.

20. A computer program product comprising a non-transitory computer-readable storage medium having instructions encoded thereon that, when executed by a processor, cause the processor to:

instruct at least one of a plurality of fiducial markers to emit light, each fiducial marker positioned at a different location on a body of a fiducial device, the body configured to fit on a portion of a user's body;

capture, by an imaging device separate from the fiducial device and the user's body, one or more images of the fiducial device by capturing the light emitted from the at least one fiducial marker, the one or more images including an image with a fiducial marker of the plurality of fiducial markers;

determine that a virtual touch event occurred based on a movement of the portion of the user's body;

responsive to the determination, receive the one or more images including at least one image of at least one of the fiducial markers;

determine a position of the fiducial device in a virtual space based in part on the at least one image of the at least one fiducial marker;

determine a position of the portion of the user's body in the virtual space, based on the determined position of the fiducial device; and generate a haptic feedback signal comprising a haptic feedback for a user, based on the determined position of the portion of the user's body in the virtual space.

\* \* \* \* \*

UNITED STATES PATENT AND TRADEMARK OFFICE
CERTIFICATE OF CORRECTION

PATENT NO. : 10,712,818 B2
APPLICATION NO. : 16/106633
DATED : July 14, 2020
INVENTOR(S) : Keller et al.

Page 1 of 1

It is certified that error appears in the above-identified patent and that said Letters Patent is hereby corrected as shown below:

On the Title Page

Item (56), Column 2, under "U.S. Patent Documents", Line 2, after "Gomez" insert -- et al. --.

In the Claims

In Column 11, in Claim 1, Line 60, after "based" insert -- in --.

Signed and Sealed this
Twenty-second Day of December, 2020

Andrei Iancu
*Director of the United States Patent and Trademark Office*